US010998591B2

(12) United States Patent
Oh et al.

(10) Patent No.: US 10,998,591 B2
(45) Date of Patent: May 4, 2021

(54) BATTERY AND CAPACITOR HYBRID ASSEMBLY STRUCTURE

(71) Applicant: SAMHWA CAPACITOR CO., LTD., Yongin-si (KR)

(72) Inventors: Young Joo Oh, Seoul (KR); Jung Rag Yoon, Yongin-si (KR); Jong Kyu Lee, Gunpo-si (KR); Byung Gwan Lee, Osan-si (KR)

(73) Assignee: SAMHWA CAPACITOR CO., LTD., Gyeonggi-do (KR)

( * ) Notice: Subject to any disclaimer, the term of this patent is extended or adjusted under 35 U.S.C. 154(b) by 229 days.

(21) Appl. No.: 16/382,690

(22) Filed: Apr. 12, 2019

(65) Prior Publication Data

US 2020/0028226 A1 Jan. 23, 2020

(30) Foreign Application Priority Data

Jul. 18, 2018 (KR) .................. 10-2018-0083244

(51) Int. Cl.
| | | |
|---|---|---|
| *H01M 10/42* | (2006.01) | |
| *H01M 16/00* | (2006.01) | |
| *H01M 4/485* | (2010.01) | |
| *H01M 4/505* | (2010.01) | |
| *H01M 4/62* | (2006.01) | |
| *H01M 4/58* | (2010.01) | |
| *H01M 4/525* | (2010.01) | |
| *H01G 11/62* | (2013.01) | |
| *H01M 10/0587* | (2010.01) | |
| *H01M 10/0525* | (2010.01) | |

(Continued)

(52) U.S. Cl.
CPC ............ *H01M 16/00* (2013.01); *H01G 11/08* (2013.01); *H01G 11/26* (2013.01); *H01G 11/34* (2013.01); *H01G 11/52* (2013.01); *H01G 11/62* (2013.01); *H01G 11/70* (2013.01); *H01G 11/74* (2013.01); *H01G 11/80* (2013.01); *H01M 4/485* (2013.01); *H01M 4/505* (2013.01); *H01M 4/525* (2013.01); *H01M 4/5825* (2013.01); *H01M 4/622* (2013.01); *H01M 10/0525* (2013.01); *H01M 10/0587* (2013.01); *H01M 10/4264* (2013.01); *H01M 50/213* (2021.01)

(58) Field of Classification Search
CPC ............ H01M 16/00; H01M 10/0587; H01M 10/4264; H01M 10/0525; H01M 4/485; H01M 4/505; H01M 4/622; H01M 4/5825; H01M 4/525; H01M 2/105
See application file for complete search history.

(56) References Cited

U.S. PATENT DOCUMENTS 9,780,592 B2 10/2017 Abiru et al.
2016/0285137 A1* 9/2016 Gayden ............ H01M 10/4264

FOREIGN PATENT DOCUMENTS

KR 101544024 8/2015

* cited by examiner

*Primary Examiner* — Osei K Amponsah
(74) *Attorney, Agent, or Firm* — Cantor Colburn LLP

(57) ABSTRACT

Provided is a battery and capacitor hybrid assembly structure includes a cylindrical metal casing, a circular metal cover plate connected to a top end periphery of the cylindrical metal casing by means of an insulation ring to seal an interior of the cylindrical metal casing, a capacitor disposed inside the cylindrical metal casing, a battery disposed inside the cylindrical metal casing in such a manner as to be placed above the capacitor, and an insulating and sealing member for enclosing the capacitor so that the capacitor is sealed inside the cylindrical metal casing.

12 Claims, 6 Drawing Sheets

(51) Int. Cl.
*H01G 11/80* (2013.01)
*H01G 11/08* (2013.01)
*H01G 11/26* (2013.01)
*H01G 11/74* (2013.01)
*H01G 11/52* (2013.01)
*H01G 11/70* (2013.01)
*H01G 11/34* (2013.01)
*H01M 50/213* (2021.01)

BATTERY AND CAPACITOR HYBRID ASSEMBLY STRUCTURE

BACKGROUND OF THE INVENTION

1. Technical Field

The present invention relates to a battery and capacitor hybrid assembly structure, and more particularly, to a battery and capacitor hybrid assembly structure that is configured to allow a battery and a capacitor to be connected in parallel inside a single cylindrical casing in such a manner as to be electrically connected to each other, thereby easily coupling the battery and the capacitor having the same voltage.

2. Description of the Related Art

A battery is connected to a capacitor so as to extend a lifespan through the equalization of charge and discharge currents and the reduction in the number of charging and discharging times, and the technology related thereto is disclosed in Korean Patent No. 10-1544024 (Patent document 1).

The Patent document 1 relates to a charging and discharging device capable of handling a wide input range with the use of a battery and an electric double layer capacitor, and the conventional charging and discharging device includes a generator connected to a charging and discharging controller and having a generating unit, a charger, and a regeneration energy. A charging circuit of the charging and discharging controller is configured to allow the carbon battery and the electric double layer capacitor to be in turn connected to an electric load, so that it has a separate charging path, thereby performing high current charging as an advantage of the electric double layer capacitor, equalizing the charge and discharge currents of the battery, and reducing the number of charging and discharging times of the battery to extend the lifespan of the battery.

According to the Patent document 1, the battery is connected in parallel to the electric double layer capacitor so as to extend the lifespan determined upon the charging and discharging. In detail, the conventional battery as disclosed in the Patent document 1 is connected in parallel to the electric double layer capacitor so as to extend the lifespan, and to do this, separate work like wire connection has to be required so that it is not easy to connect the battery and the electric double layer capacitor in parallel to each other.

PRIOR ART DOCUMENT

Patent Document (Patent Document 1): Korean Patent No. 10-1544024

SUMMARY OF THE INVENTION

Accordingly, the present invention has been made in view of the above-mentioned problems occurring in the related art, and it is an object of the present invention to provide a battery and capacitor hybrid assembly structure that is configured to allow a battery and a capacitor to be connected in parallel inside a single cylindrical casing in such a manner as to be electrically connected to each other, thereby easily coupling the battery and the capacitor having the same voltage.

It is another object of the present invention to provide a battery and capacitor hybrid assembly structure that is configured to couple a capacitor and a battery inside a single cylindrical metal casing, thereby reducing the number of components for coupling the battery and the capacitor to lower a manufacturing cost.

To accomplish the above-mentioned objects, according to the present invention, there is provided a battery and capacitor hybrid assembly structure includes: a cylindrical metal casing; a circular metal cover plate connected to a top end periphery of the cylindrical metal casing by means of an insulation ring to seal an interior of the cylindrical metal casing; a capacitor disposed inside the cylindrical metal casing; a battery disposed inside the cylindrical metal casing in such a manner as to be placed above the capacitor; and an insulating and sealing member for enclosing the capacitor so that the capacitor is sealed inside the cylindrical metal casing, wherein the capacitor comprises a first metal bobbin and a first cylindrical winding body wound on the first metal bobbin and having a first metal layer formed spaced apart from the first metal bobbin on the underside thereof in such a manner as to be connected to the inner bottom of the cylindrical metal casing and a second metal layer formed on the top thereof in such a manner as to be connected to the first metal bobbin, and the battery includes a second metal bobbin whose lower periphery is connected to the first metal bobbin and whose upper periphery is connected to the circular metal cover plate and a second cylindrical winding body wound on the second metal bobbin and having a third metal layer formed on the underside thereof in such a manner as to be connected to the second metal bobbin and a fourth metal layer formed spaced apart from the second metal bobbin on the top thereof by means of a circular insulation plate in such a manner as to be connected to the inner top of the cylindrical metal casing.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION

Figure 1:
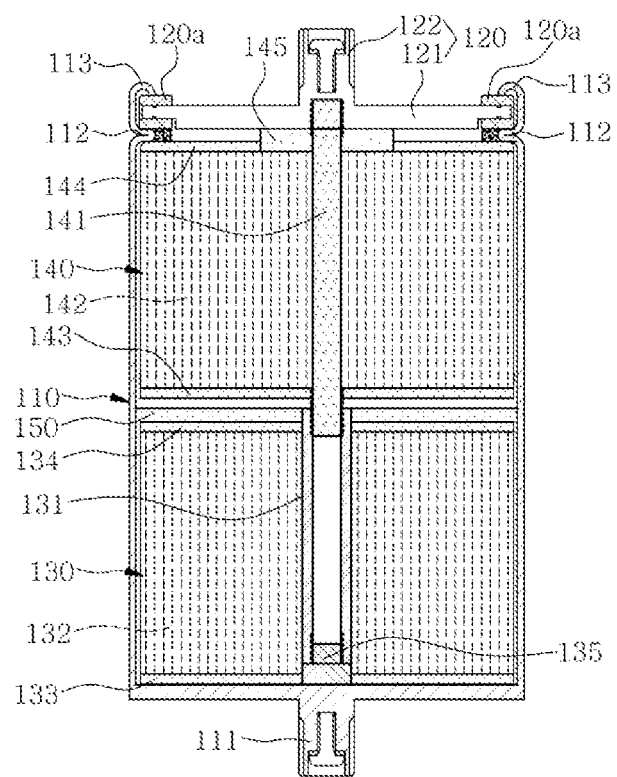
FIG. 1 is a front sectional view showing a battery and capacitor hybrid assembly structure according to the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
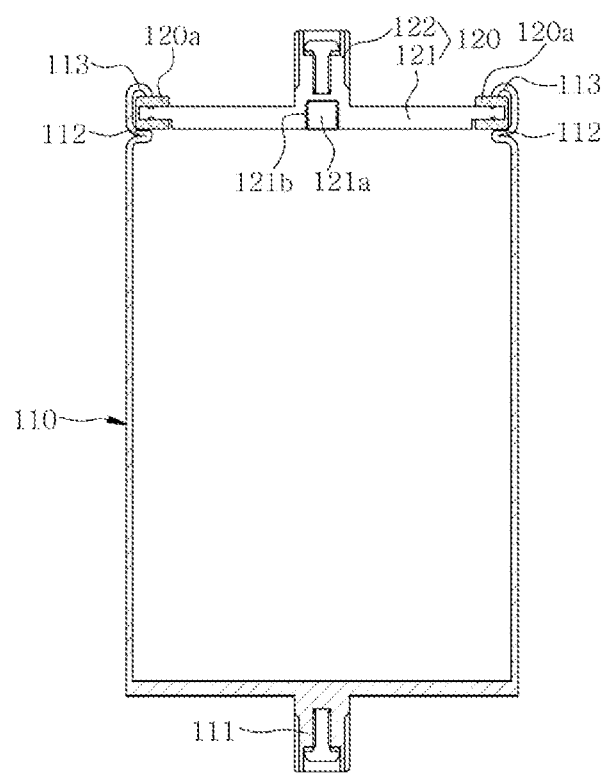
FIG. 2 is a front sectional view showing a cylindrical metal casing in FIG. 1.
Figure 3:
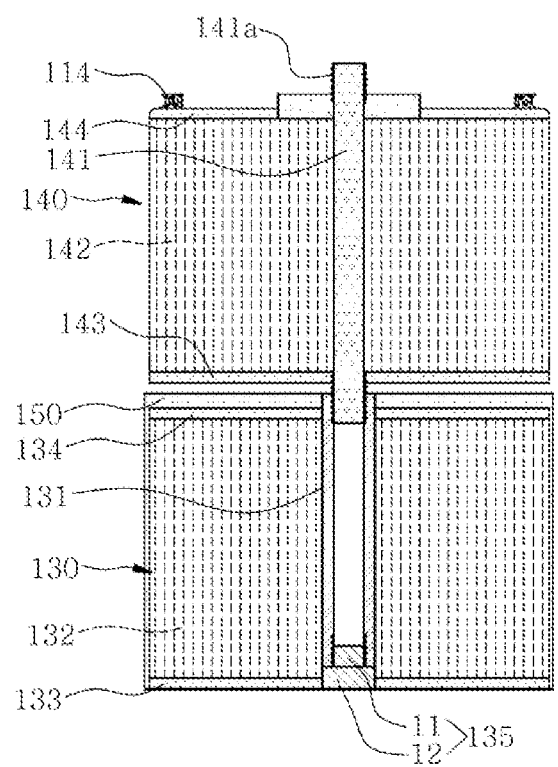
FIG. 3 is a front sectional view showing a battery and a capacitor in FIG. 1.

As shown in FIGS. 1 to 3, the battery and capacitor hybrid assembly structure according to the present invention includes a cylindrical metal casing 110, a circular metal cover plate 120, a capacitor 130, a battery 140, and an insulating and sealing member 150.

The cylindrical metal casing 110 serves to generally support the battery 140 and the capacitor 130 in the battery and capacitor hybrid assembly structure according to the present invention, and the circular metal cover plate 120 is connected to a top end periphery of the cylindrical metal casing 110 by means of an insulation ring 120a to seal the interior of the cylindrical metal casing 110. The capacitor 130 is disposed inside the cylindrical metal casing 110, and the battery 140 is disposed inside the cylindrical metal casing 110 in such a manner as to be placed above the capacitor 130. The insulating and sealing member 150 serves to enclose the capacitor 130 so that the capacitor 130 can be sealed inside the cylindrical metal casing 110, and the capacitor 130 sealed by the insulating and sealing member 150 includes a first metal bobbin 131 and a first cylindrical winding body 132, so that the first metal bobbin 131 serves to wind the first cylindrical winding body 132 thereon. The first cylindrical winding body 132, which is wound on the first metal bobbin 131, includes a first metal layer 133 formed spaced apart from the first metal bobbin 131 on the underside thereof in such a manner as to be connected to the inner bottom of the cylindrical metal casing 110 and a second metal layer 134 formed on the top thereof in such a manner as to be connected to the first metal bobbin 131. The battery 140 includes a second metal bobbin 141 and a second cylindrical winding body 142, and the second metal bobbin 141 serves to wind the second cylindrical winding body 142 thereon in such a manner as to allow the lower periphery thereof to be connected to the first metal bobbin 131 and to allow the upper periphery thereof to be connected to the circular metal cover plate 120. The second cylindrical winding body 142 is wound on the second metal bobbin 141 and has a third metal layer 143 formed on the underside thereof in such a manner as to be connected to the second metal bobbin 141 and a fourth metal layer 144 formed spaced apart from the second metal bobbin 141 on the top thereof by means of a circular insulation plate 145 in such a manner as to be connected to the inner top of the cylindrical metal casing 110.

A configuration of the battery and capacitor hybrid assembly structure according to the present invention will be in detail explained below.

As shown in FIGS. 1 and 2, the cylindrical metal casing 110, which serves to generally support the battery 140 and the capacitor 130, is open on top thereof and has a first external terminal 111 protruding downward from the underside thereof. Further, the cylindrical metal casing 110 has a bead portion 112 and a curled portion 113 formed on top thereof. The bead portion 112 serves to supportingly come into contact with the top end periphery of the battery 140 disposed inside the cylindrical metal casing 110 in such a manner as to be electrically connected to the battery 140, and the curled portion 113 is formed on one side periphery of the bead portion 112, that is, the top end periphery of the cylindrical metal casing 110 in such a manner as to support the insulation ring 120a fitted to the edge periphery of the circular metal cover plate 120 to allow the interior of the cylindrical metal casing 110 to be sealed. In this case, an O-ring is used as the insulation ring 120a.

The cylindrical metal casing 110 is made of aluminum (Al) or stainless steel (SUS), so that it has excellent electrical conductivity, and has the first external terminal 111 disposed integrally with the underside thereof. The first external terminal 111 is used as a common electrode, that is, a negative terminal in the battery and capacitor hybrid assembly structure according to the present invention. The inner bottom of the cylindrical metal casing 110 is bonded, by means of known laser welding, to the first metal layer 133 formed spaced apart from the first metal bobbin 131 on the underside of the first cylindrical winding body 132 of the capacitor 130 and is thus electrically connected thereto.

As the bead portion 112 of the cylindrical metal casing 110 serves to supportingly come into contact with the top end periphery of the second cylindrical winding body 142 of the battery 140 disposed inside the cylindrical metal casing 110, the cylindrical metal casing 110 and the fourth metal layer 144 formed on the top of the second cylindrical winding body 142 are electrically connected to each other by means of the bead portion 112. So as to allow the bead portion 112 to more rigidly support the top end periphery of the battery 140 and to improve durability in the electrical connection between the fourth metal layer 144 of the second cylindrical winding body 142 and the bead portion 112 of the cylindrical metal casing 110, a connection metal layer 114 is formed between the top end periphery of the battery 140 and the bead portion 112. After the bead portion 112 is formed on the top end periphery of the cylindrical metal casing 110 to support the top end periphery of the battery 140, first, the connection metal layer 114 is formed by applying a metal material to a space between the top end periphery of the battery 140 and the bead portion 112 by means of dispensing.

As shown in FIGS. 1 and 2, the circular metal cover plate 120 includes a circular metal plate 121 and a second external terminal 122 and is connected to the top end periphery of the cylindrical metal casing 110 by means of the insulation ring 120a in such a manner as to allow the interior of the cylindrical metal casing 110 to be sealed. The circular metal plate 121 of the circular metal cover plate 120 is configured to allow the insulation ring 120a to be fitted to the edge periphery thereof and has a screw thread groove 121a formed on the underside thereof in such a manner as to insert the second metal bobbin 141 thereinto. In this case, the screw thread groove 121a has a screw thread 121b formed on the inner peripheral surface thereof in such a manner as to be fastened to a fourth screw thread portion 141b of the second metal bobbin 141.

Figure 4:
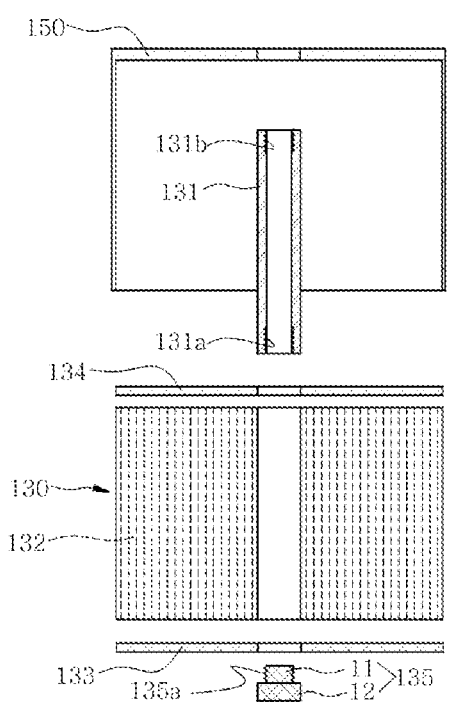
FIG. 4 is an exploded front sectional view showing the capacitor in FIG. 3.

As shown in FIGS. 1, 3 and 4, the capacitor 130 includes the first metal bobbin 131, the first cylindrical winding body 132, and an insulation cap member 135.

The first metal bobbin 131 is formed of a hollow cylinder and has a first screw thread portion 131a formed on the lower inner peripheral surface thereof and a second screw thread portion 131b formed on the upper inner peripheral surface thereof. The first cylindrical winding body 132 is wound to the form of a cylinder on the outer peripheral surfaces of the first metal bobbin 131 and the insulation cap member 135. The insulation cap member 135 has a fifth screw thread portion 135a formed on the outer peripheral surface thereof in such a manner as to engage with the first screw thread portion 131a, so that the insulation cap member 135 is coupled to the first metal bobbin 131. In detail, the insulation cap member 135 serves to prevent the lower end periphery of the first metal bobbin 131 from coming into contact with the inner bottom of the cylindrical metal casing 110 in such a manner as to be electrically connected to the cylindrical metal casing 110 and includes a first cylinder 11 and a second cylinder 12. The first cylinder 11 of the insulation cap member 135 is configured to allow the fifth screw thread portion 135a to be formed on the outer peripheral surface thereof and is inserted into the interior of the first metal bobbin 131 in such a manner as to allow the fifth screw thread portion 135a to engage with the first screw thread portion 131a of the first metal bobbin 131, and the second cylinder 12 is disposed integrally with the first cylinder 11 on the underside of the first cylinder 11 and has the same diameter as the first metal bobbin 131. So as to allow the first cylindrical winding body 132 to be wound on the outer peripheral surfaces of the second cylinder 12 and the first metal bobbin 131, in detail, the diameter of the second cylinder 12 is the same as of the first metal bobbin 131.

Figure 6:
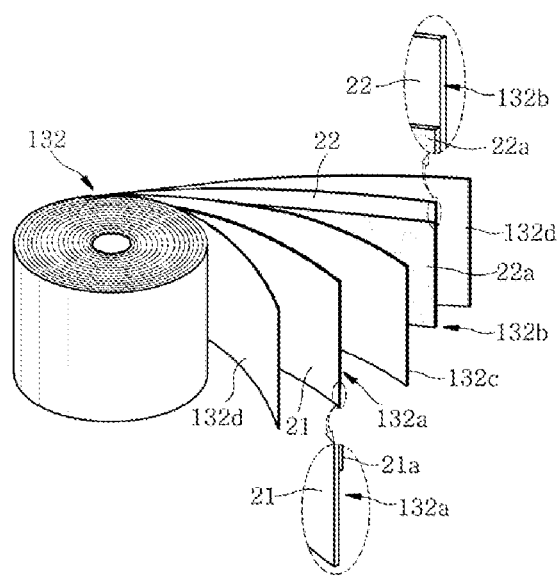
FIG. 6 is a perspective view showing a cylindrical winding body of the capacitor in FIG. 3.

As shown in FIG. 6, the first cylindrical winding body 132 includes a negative electrode 132a, a positive electrode 132b, and a separation film 132c.

The negative electrode 132a includes a negative electrode layer 21a and a first current collector 21. The negative electrode layer 21a serves as a negative electrode of the capacitor 130 and is formed in such a manner as to allow the lower portion of the first current collector 21 to be exposed therefrom. The positive electrode 132b includes a positive electrode layer 22a and a second current collector 22. The positive electrode layer 22a, which is opposite to the negative electrode layer 21a, serves as a negative electrode of the capacitor 130 and is formed in such a manner as to allow the upper portion of the second current collector 22 to be exposed therefrom. The separation film 132c is disposed between the negative electrode 132a and the positive electrode 132b.

The first current collector 21, the second current collector 22, and the separation film 132c are laminated on each other in such a manner as to allow the first current collector 21 of the first cylindrical winding body 132 to more protrude downward than the negative electrode layer 21a or the separation film 132c and to allow the second current collector 22 to more protrude upward than the positive electrode layer 22a or the separation film 132c, and in this state, insulation films 132d are disposed on one side or the other side of the first current collector 21 and the second current collector 22. After that, the first cylindrical winding body 132 is wound to the form of the cylinder on the outer peripheral surface of the first metal bobbin 131 and is impregnated with an electrolyte. Through the impregnation with the electrolyte, the first metal layer 133 is formed on the underside of the first cylindrical winding body 132 and is thus connected to the bottom of the cylindrical metal casing 110 by means of the laser welding, and the second metal layer 134 is formed on the top thereof and is thus connected to the first metal bobbin 131. If the first cylindrical winding body 132 is impregnated with the electrolyte, in detail, the first metal layer 133 is formed on the underside of the first cylindrical winding body 132 so that it is connected to the bottom of the cylindrical metal casing 110 by means of the laser welding, and the second metal layer 134 is formed on the top thereof so that it is connected to the first metal bobbin 131.

The first metal layer 133 is bonded to the underside of the first cylindrical winding body 132, that is, the lower portion of the first current collector 21 that more protrudes downward than the negative electrode layer 21a or the separation film 132c and is thus electrically connected to the first cylindrical winding body 132, and the second metal layer 134 is bonded to the top of the first cylindrical winding body 132, that is, the upper portion of the second current collector 22 that more protrudes downward than the positive electrode layer 22a or the separation film 132c and is thus electrically connected to the first cylindrical winding body 132. As an electric double layer capacitor is used as the capacitor 130, in this case, each of the negative electrode layer 21a and the positive electrode layer 22a is made of a mixture made by mixing activated carbon, a conductive material, and a binder. The conductive material is one selected from a Super-P, a Ketjenblack, and a carbon black, and the binder is one selected from PVDF (polyvinylidene difluoride), PTFE (polytetrafluoroethylene), SBR (styrene butadiene rubber), and CMC (carboxymethylcellulose). The electrolyte includes one or more selected from $TEABF_4$ (tetraethylammonium tetrafluoroborate), $TEMABF_4$ (triethylmethylammonium tetrafluoroborate), and $SBPBF_4$ (spiro-(1,1')-bipyrrolidium tetrafluoroborate).

Figure 5:
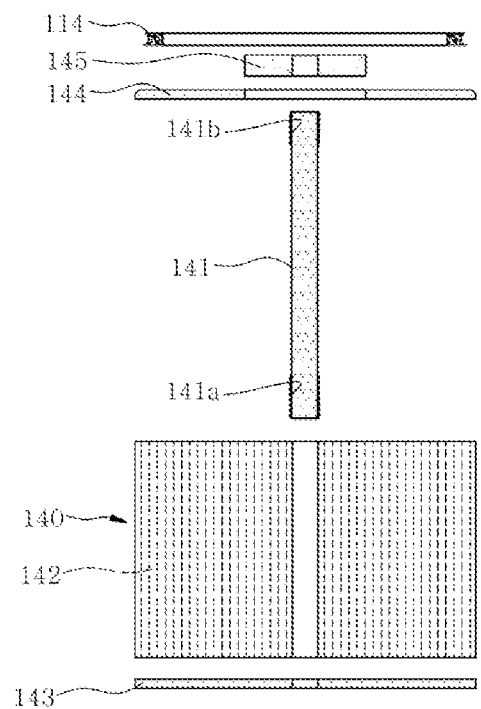
FIG. 5 is an exploded front sectional view showing the battery in FIG. 3.

As shown in FIGS. 1, 3 and 5, the battery 140 includes the second metal bobbin 141, the second cylindrical winding body 142, and the circular insulation plate 145.

The second metal bobbin 141 is formed of a hollow cylinder and has a third screw thread portion 141a formed on the lower inner peripheral surface thereof and the fourth screw thread portion 141b formed on the upper inner peripheral surface thereof. The second cylindrical winding body 142 is wound to the form of a cylinder on the outer peripheral surface of the second metal bobbin 141, and the circular insulation plate 145 is fitted to the second metal bobbin 141 in such a manner as to be located above the second cylindrical winding body 142.

The second metal bobbin 141 is inserted into the first metal bobbin 131 in such a manner as to allow the third screw thread portion 141a to engage with the second screw thread portion 131b of the first metal bobbin 131, and the fourth screw thread portion 141b of the second metal bobbin 141 is fastendedly inserted into the circular metal cover plate 120. In detail, the fourth screw thread portion 141b of the second metal bobbin 141 is inserted into the screw thread groove 121a of the circular metal cover plate 120 and is thus engagingly coupled to the screw thread 121b formed along the inner peripheral surface of the screw thread groove 121, so that the second metal bobbin 141 is electrically connected to the circular metal cover plate 120 and is thus electrically connected to the second external terminal 122 of the circular metal cover plate 120. The circular insulation plate 145 is disposed between the second cylindrical winding body 142 and the circular metal cover plate 120 in such a manner as to be fitted to the upper periphery of the second metal bobbin 141, so that the second cylindrical winding body 142 and the circular metal cover plate 120 are insulated from each other. In detail, the circular insulation plate 145 prevents the fourth metal layer 144 from coming into contact with the second metal bobbin 141 and the circular metal cover plate 120 in such a manner as to be electrically connected to the circular metal cover plate 120.

Figure 7:
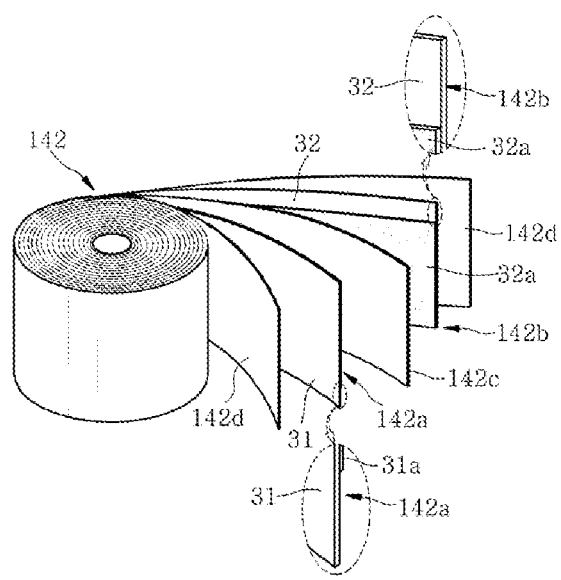
FIG. 7 is a perspective view showing a cylindrical winding body of the battery in FIG. 3.

As shown in FIG. 7, the second cylindrical winding body 142 of the battery 140 includes a negative electrode 142a, a positive electrode 142b, and a separation film 142c.

The negative electrode 142a includes a negative electrode layer 31a and a third current collector 31. The negative electrode layer 31a serves as a negative electrode of the battery 140 and is formed in such a manner as to allow the upper portion of the third current collector 31 to be exposed therefrom. The positive electrode 142b includes a positive electrode layer 32a and a fourth current collector 32. The positive electrode layer 32a, which is opposite to the negative electrode layer 31a, serves as a negative electrode of the battery 140 and is formed in such a manner as to allow the lower portion of the fourth current collector 32 to be exposed therefrom. The separation film 142c is disposed between the negative electrode 142a and the positive electrode 142b.

The third current collector 31, the fourth current collector 32, and the separation film 142c are laminated on each other in such a manner as to allow the third current collector 31 of the second cylindrical winding body 142 to more protrude upward than the negative electrode layer 31a or the separation film 142c and to allow the fourth current collector 32 to more protrude downward than the positive electrode layer 32a or the separation film 142c, and in this state, insulation films 142d are disposed on one side or the other side of the third current collector 31 and the fourth current collector 32. After that, the second cylindrical winding body 142 is wound to the form of the cylinder on the outer peripheral surface of the second metal bobbin 141 and is impregnated with an electrolyte. Through the impregnation with the electrolyte, the third metal layer 143 is formed on the underside of the second cylindrical winding body 142 in such a manner as to be connected to the second metal bobbin 141, and the fourth metal layer 144 is formed on the top thereof in such a manner as to be spaced apart from the second metal bobbin 141 by means of the circular insulation plate 145. If the second cylindrical winding body 142 is wound to the form of the cylinder on the outer peripheral surface of the second metal bobbin 141, in detail, the second cylindrical winding body 142 is impregnated with the electrolyte, and after that, the third metal layer 143 and the fourth metal layer 144 are formed on the underside and top of the second cylindrical winding body 142.

The third metal layer 143 is bonded to the top of the second cylindrical winding body 142, that is, the upper portion of the third current collector 31 that more protrudes upward than the negative electrode layer 31a or the separation film 142c and is thus electrically connected to the second cylindrical winding body 142, and the fourth metal layer 144 is bonded to the underside of the second cylindrical winding body 142, that is, the lower portion of the fourth current collector 32 that more protrudes downward than the positive electrode layer 32a or the separation film 142c and is thus electrically connected to the second cylindrical winding body 142. As a lithium ion battery is used as the battery 140, in this case, the negative electrode layer 31a is made of a mixture made by mixing $Li_4Ti_5O_{11}$, a conductive material, and a binder, and the positive electrode layer 32a is made of a mixture made by mixing one of $LiMn_{1.5}Ni_{0.5}O_4$ and $LiCoPO_4$, a conductive material, and a binder. The conductive material is one selected from a Super-P, a Ketjenblack, and a carbon black, and the binder is one selected from PVDF (polyvinylidene difluoride), PTFE (polytetrafluoroethylene), SBR (styrene butadiene rubber), and CMC (carboxymethylcellulose). The electrolyte includes one or more selected from $LiBF_4$, $LiPF_6$, $LiClO_4$, $LiAsF_6$, $LiAlCl_4$, $LiCF_3SO_3$, $LiN(SO_2CF_3)_2$, $LiC(SO_2CFO_3$, LiBOB (Lithium bis(oxalate)borate).

The insulating and sealing member 150 is made of EMC (epoxy molding compound) or urethane to seal the capacitor 130, so that the capacitor 130 and the battery 140 are completely connected, independently of to each other, that is, in parallel to each other, inside the cylindrical metal casing 110.

As mentioned above, the capacitor 130 and the battery 140 in the battery and capacitor hybrid assembly structure according to the present invention are disposed inside the cylindrical metal casing 110, independently of to each other, in such a manner as to be connected in parallel to each other. In detail, the electric double layer capacitor is used as the capacitor 130, and the lithium ion battery is used as the battery 140. The capacitor 130 and the battery 140 have the same voltage, that is, the same rated voltage as each other. For example, if the rated voltage of the battery 140 is 2.3 V (voltage), the rated voltage of the capacitor 130 is 2.3 V, and if the rated voltage of the battery 140 is 3.2 V (voltage), the rated voltage of the capacitor 130 is 3.2 V. That is, the rated voltage of the capacitor 130 is the same as of the battery 140. For example, if the rated voltage of the capacitor 130 is 2.3 to 3.2 V (voltage), the rated voltage of the battery 140 is 2.3 to 3.2 V. The available rated voltage of the capacitor 130 is 0.1 to 3.2 V (voltage), and the available rated voltage of the battery 140 is 2.3 to 3.2 V. In detail, the rated voltage of the capacitor 130 is 0.1 to 3.2 V (voltage), and the rated voltage of the battery 140 is 2.3 to 3.2 V. Further, an energy ratio (Wh) of the capacitor 130 to the battery 140 is 30 to 70% to 30 to 70%, and an energy ratio (Wh) of the capacitor 130 to the battery 140 with respect to the output voltage V is 10 to 30% to 70 to 90%. Under the above-mentioned conditions, the capacitor 130 and the battery 140 are disposed inside the cylindrical metal casing 110, independently of to each other, in such a manner as to be connected in parallel to each other.

The battery and capacitor hybrid assembly structure according to the present invention is configured to allow the capacitor 130 and the battery 140 to be located inside the single cylindrical metal casing 110, independently of to each other, in such a manner as to be connected in parallel to each other. In detail, the first metal layer 133 of the capacitor 130 and the third metal layer 143 of the battery 140 are electrically connected to the first external terminal 111 through the cylindrical metal casing 110, and the second metal layer 134 of the capacitor 130 and the fourth metal layer 144 of the battery 140 are electrically connected to the second external terminal 122 through the first metal bobbin 131 and the second metal bobbin 141 fittedly connected to each other, so that the capacitor 130 and the battery 140 are connected in parallel to each other. In more detail, the first metal layer 133 of the capacitor 130 is formed on the underside of the first cylindrical winding body 132 and is bonded to the lower portion of the first current collector 21 more protruding downward from the negative layer 21a or the separation film 132c in such a manner as to be electrically connected thereto, and the second metal layer 134 of the capacitor 130 is formed on the top of the first cylindrical winding body 132 and is bonded to the upper portion of the second current collector 22 more protruding upward from the positive layer 22a or the separation film 132c in such a manner as to be electrically connected thereto. Also, the third metal layer 143 of the battery 140 is formed on the top of the second cylindrical winding body 142 and is bonded to the lower portion of the third current collector 31 more protruding upward from the negative layer 31a or the separation film 142c in such a manner as to be electrically connected thereto, and the fourth metal layer 144 of the battery 140 is formed on the underside of the second cylindrical winding body 142 and is bonded to the lower portion of the fourth current collector 32 more protruding downward from the positive layer 32a or the separation film 142c in such a manner as to be electrically connected thereto, so that the capacitor 130 and the battery 140 are connected in parallel to each other.

As described above, the battery and capacitor hybrid assembly structure according to the present invention is configured to allow the capacitor and the battery to be connected in parallel to each other inside the single cylindrical metal casing in such a manner as to be electrically connected to each other, thereby easily coupling the battery and the capacitor having the same voltage as each other and reducing the number of components for coupling the battery and the capacitor to lower the manufacturing cost.

Further, the battery and capacitor hybrid assembly structure according to the present invention is applicable to a field of manufacturing a battery or electric double layer capacitor.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A battery and capacitor hybrid assembly structure comprising:
    a cylindrical metal casing;
    a circular metal cover plate connected to a top end periphery of the cylindrical metal casing by means of an insulation ring to seal an interior of the cylindrical metal casing;
    a capacitor disposed inside the cylindrical metal casing;
    a battery disposed inside the cylindrical metal casing in such a manner as to be placed above the capacitor; and
    an insulating and sealing member for enclosing the capacitor so that the capacitor is sealed inside the cylindrical metal casing,
    wherein the capacitor comprises a first metal bobbin and a first cylindrical winding body wound on the first metal bobbin and having a first metal layer formed spaced apart from the first metal bobbin on the underside thereof in such a manner as to be connected to the inner bottom of the cylindrical metal casing and a second metal layer formed on the top thereof in such a manner as to be connected to the first metal bobbin, and the battery includes a second metal bobbin whose lower periphery is connected to the first metal bobbin and whose upper periphery is connected to the circular metal cover plate and a second cylindrical winding body wound on the second metal bobbin and having a third metal layer formed on the underside thereof in such a manner as to be connected to the second metal bobbin and a fourth metal layer formed spaced apart from the second metal bobbin on the top thereof by means of a circular insulation plate in such a manner as to be connected to the inner top of the cylindrical metal casing.

2. The battery and capacitor hybrid assembly structure according to claim 1, wherein the cylindrical metal casing is open on top thereof, is made of aluminum (Al) or stainless steel (SUS), and comprises a bead portion adapted to supportingly come into contact with the top end periphery of the battery disposed inside the cylindrical metal casing in such a manner as to be electrically connected to the battery, a curled portion formed on one side periphery of the bead portion in such a manner as to support the insulation ring fitted to the edge periphery of the circular metal cover plate, and a first external terminal protruding downward from the underside thereof.

3. The battery and capacitor hybrid assembly structure according to claim 1, wherein the circular metal cover plate comprises:
    a circular metal plate adapted to fit the insulation ring to the edge periphery thereof and having a screw thread groove formed on the underside thereof in such a manner as to insert the second metal bobbin, the screw thread groove having a screw thread formed on the inner peripheral surface thereof in such a manner as to be fastened to a fourth screw thread portion of the second metal bobbin; and
    a second external terminal protruding from the top of the circular metal plate.

4. The battery and capacitor hybrid assembly structure according to claim 1, wherein the capacitor comprises:
    the first metal bobbin formed of a hollow cylinder and having a first screw thread portion formed on the lower inner peripheral surface thereof and a second screw thread portion formed on the upper inner peripheral surface thereof;
    an insulation cap member having a fifth screw thread portion formed on the outer peripheral surface thereof in such a manner as to engage with the first screw thread portion of the first metal bobbin so that the insulation cap member is coupled to the first metal bobbin; and
    the first cylindrical winding body wound to the form of a cylinder on the outer peripheral surfaces of the first metal bobbin and the insulation cap member,
    wherein the insulation cap member comprises a first cylinder having the fifth screw thread portion formed on the outer peripheral surface thereof, and a second cylinder disposed integrally with the first cylinder on the underside of the first cylinder and having the same diameter as the first metal bobbin.

5. The battery and capacitor hybrid assembly structure according to claim 4, wherein the first cylindrical winding body comprises:
    a negative electrode having a negative electrode layer and a first current collector on which the negative electrode layer is formed in such a manner as to allow the lower portion thereof to be exposed therefrom;
    a positive electrode having a positive electrode layer opposite to the negative electrode layer and a second current collector on which the positive electrode layer is formed in such a manner as to allow the upper portion thereof to be exposed therefrom;
    a separation film disposed between the negative electrode and the positive electrode; and
    insulation films disposed on one side or the other side of the first current collector and the second current collector in a state where the first current collector, the second current collector, and the separation film are laminated on each other in such a manner as to allow the first current collector of the first cylindrical winding body to more protrude downward than the negative electrode layer or the separation film and to allow the second current collector to more protrude upward than the positive electrode layer or the separation film, so that if the first cylindrical winding body is wound to the form of the cylinder on the outer peripheral surface of the first metal bobbin and is then impregnated with an electrolyte, the first metal layer is formed on the underside of the first cylindrical winding body in such a manner as to be connected to the bottom of the cylindrical metal casing by means of laser welding, and the second metal layer is formed on the top thereof in such a manner as to be connected to the first metal bobbin, each of the negative electrode layer and the positive electrode layer being made of a mixture made by mixing activated carbon, a conductive material, and a binder, the conductive material being one selected from a Super-P, a Ketjenblack, and a carbon black, the binder being one selected from PVDF (polyvinylidene difluoride), PTFE (polytetrafluoroethylene), SBR (styrene butadiene rubber), and CMC (carboxymethylcellulose), and the electrolyte comprising one or more selected from TEABF$_4$ (tetraethylammonium tetrafluoroborate), TEMABF$_4$ (triethylmethylammonium tetrafluoroborate), and SBPBF$_4$ (spiro-(1,1')-bipyrrolidium tetrafluoroborate).

6. The battery and capacitor hybrid assembly structure according to claim 1, wherein the battery comprises:
the second metal bobbin formed of a hollow cylinder and having a third screw thread portion formed on the lower inner peripheral surface thereof and the fourth screw thread portion formed on the upper inner peripheral surface thereof;
the second cylindrical winding body wound to the form of a cylinder on the outer peripheral surface of the second metal bobbin; and
the circular insulation plate fitted to the second metal bobbin in such a manner as to be located above the second cylindrical winding body,
whereby the second metal bobbin is inserted into the first metal bobbin in such a manner as to allow the third screw thread portion to engage with the second screw thread portion of the first metal bobbin, the fourth screw thread portion of the second metal bobbin is fastendedly inserted into the circular metal cover plate, and the circular insulation plate is disposed between the second cylindrical winding body and the circular metal cover plate in such a manner as to be fitted to the upper periphery of the second metal bobbin to allow the second cylindrical winding body and the circular metal cover plate to be insulated from each other.

7. The battery and capacitor hybrid assembly structure according to claim 6, wherein the second cylindrical winding body comprises:
a negative electrode having a negative electrode layer and a third current collector on which the negative electrode layer is formed in such a manner as to allow the upper portion thereof to be exposed therefrom;
a positive electrode having a positive electrode layer formed opposite to the negative electrode layer and a fourth current collector on which the positive electrode layer is formed in such a manner as to allow the lower portion thereof to be exposed therefrom;
a separation film disposed between the negative electrode and the positive electrode; and
insulation films disposed on one side or the other side of the third current collector and the fourth current collector in the state where the third current collector, the fourth current collector, and the separation film are laminated on each other in such a manner as to allow the third current collector of the second cylindrical winding body to more protrude upward than the negative electrode layer or the separation film and to allow the fourth current collector of the second cylindrical winding body to more protrude downward than the positive electrode layer or the separation film, so that if the second cylindrical winding body is wound to the form of the cylinder on the outer peripheral surface of the second metal bobbin and is impregnated with an electrolyte, the third metal layer is formed on the underside of the second cylindrical winding body in such a manner as to be connected to the second metal bobbin, and the fourth metal layer is formed on the top thereof in such a manner as to be spaced apart from the second metal bobbin by means of the circular insulation plate, the negative electrode layer being made of a mixture made by mixing Li$_4$Ti$_5$O$_{11}$, a conductive material, and a binder, the positive electrode layer being made of a mixture made by mixing one of LiMn$_{1.5}$Ni$_{0.5}$O$_4$ and LiCoPO$_4$, a conductive material, and a binder, the conductive material being one selected from a Super-P, a Ketjenblack, and a carbon black, the binder being one selected from PVDF (polyvinylidene difluoride), PTFE (polytetrafluoroethylene), SBR (styrene butadiene rubber), and CMC (carboxymethylcellulose), and the electrolyte comprising one or more selected from LiBF$_4$, LiPF$_6$, LiClO$_4$, LiAsF$_6$, LiAlCl$_4$, LiCF$_3$SO$_3$, LiN(SO$_2$CF$_3$)$_2$, LiC(SO$_2$CF$_3$)$_3$, LiBOB (Lithium bis(oxalate)borate).

8. The battery and capacitor hybrid assembly structure according to claim 1, wherein the capacitor is an electric double layer capacitor and the battery is a lithium ion battery.

9. The battery and capacitor hybrid assembly structure according to claim 1, wherein the capacitor and the battery have the same rated voltage as each other.

10. The battery and capacitor hybrid assembly structure according to claim 1, wherein a rated voltage of the capacitor 130 is 2.3 to 3.2 V (voltage), a rated voltage of the battery is 2.3 to 3.2 V, an energy ratio (Wh) of the capacitor to the battery is 30 to 70% to 30 to 70%, and an energy ratio (Wh) of the capacitor to the battery with respect to output voltage V is 10 to 30% to 70 to 90%.

11. The battery and capacitor hybrid assembly structure according to claim 1, wherein the capacitor and the battery are connected in parallel to each other in such a manner as to allow the first metal layer of the capacitor and the third metal layer of the battery to be electrically connected to the first external terminal through the cylindrical metal casing, to allow the second metal layer of the capacitor and the fourth metal layer of the battery to be electrically connected to the second external terminal through the first metal bobbin and the second metal bobbin fittedly connected to each other, to allow the first metal layer of the capacitor formed on the underside of the first cylindrical winding body to be bonded to the lower portion of the first current collector more protruding downward from the negative layer or the separation film and thus electrically connected thereto, to allow the second metal layer of the capacitor formed on the top of the first cylindrical winding body to be bonded to the upper portion of the second current collector more protruding upward from the positive layer or the separation film and thus electrically connected thereto, to allow the third metal layer of the battery formed on the top of the second cylindrical winding body to be bonded to the lower portion of the third current collector more protruding upward from the negative layer or the separation film and thus electrically connected thereto, and to allow the fourth metal layer of the battery formed on the underside of the second cylindrical winding body to be bonded to the lower portion of the fourth current collector more protruding downward from the positive layer or the separation film and thus electrically connected thereto.

12. The battery and capacitor hybrid assembly structure according to claim 1, wherein the insulating and sealing member is made of EMC (epoxy molding compound) or urethane to seal the capacitor.

* * * * *